(12) United States Patent
Yang et al.

(10) Patent No.: US 11,343,149 B2
(45) Date of Patent: *May 24, 2022

(54) SELF-TRAINING CLASSIFICATION

(71) Applicant: FORESCOUT TECHNOLOGIES, INC., San Jose, CA (US)

(72) Inventors: Siying Yang, Cupertino, CA (US); Yang Zhang, Fremont, CA (US)

(73) Assignee: Forescout Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,469

(22) Filed: Sep. 17, 2020

(65) Prior Publication Data

US 2021/0006465 A1    Jan. 7, 2021

Related U.S. Application Data

(63) Continuation of application No. 16/023,413, filed on Jun. 29, 2018, now Pat. No. 10,812,334.

(51) Int. Cl.
| | |
|---|---|
| *H04L 41/0853* | (2022.01) |
| *G06N 20/00* | (2019.01) |
| *G06K 9/62* | (2022.01) |
| *H04L 43/04* | (2022.01) |
| *H04L 43/10* | (2022.01) |

(52) U.S. Cl.
CPC ........ *H04L 41/0853* (2013.01); *G06K 9/6267* (2013.01); *G06N 20/00* (2019.01); *H04L 43/04* (2013.01); *H04L 43/10* (2013.01)

(58) Field of Classification Search
CPC ..... H04L 41/0853; H04L 43/10; H04L 43/04; G06K 9/6267; G06N 20/00
See application file for complete search history.

(56) References Cited

U.S. PATENT DOCUMENTS

| | | | |
|---|---|---|---|
| 2013/0079940 | A1 | 3/2013 | Yonezawa et al. |
| 2017/0078440 | A1* | 3/2017 | Godfrey ............... G06F 11/079 |
| 2017/0270429 | A1* | 9/2017 | Bhattacharya ......... G06N 20/10 |
| 2018/0069884 | A1 | 3/2018 | Firstenberg et al. |
| 2019/0166024 | A1 | 5/2019 | Ho et al. |

(Continued)

FOREIGN PATENT DOCUMENTS

CN    109036465 A    * 12/2018

OTHER PUBLICATIONS

International Search Report and Written Opinion for International Application No. PCT/US2019/036109, dated Sep. 24, 2019.

(Continued)

*Primary Examiner* — Michael A Keller
(74) *Attorney, Agent, or Firm* — Womble Bond Dickinson (US) LLP

(57) ABSTRACT

Systems, methods, and related technologies for self-training classification are described. In certain aspects, a plurality of device classification methods with associated models are accessed. Each of the classification methods have an associated reliability level. The models of classification methods with a higher reliability level than other classifications methods are used to train the models associated with lower reliability level. The trained models and associated classification methods are thus improved.

20 Claims, 5 Drawing Sheets

(56) References Cited

U.S. PATENT DOCUMENTS

2020/0067935 A1\* 2/2020 Carnes, III ............ H04L 63/105
2020/0127892 A1\* 4/2020 Savalle ................ G06K 9/6232

OTHER PUBLICATIONS

Stamatis Karlos et al.: "A Semisupervised Cascade Classification Algorithm", Applied Computational Intelligence and Soft Computing, vol. 2016, Jan. 1, 2016, pp. 1-14.
Shuyuan Zhou et al: "Network Traffic Classification Using Tri-training Based on Statistical Flow Characteristics", 2017 IEEE TRUSTCOM/BIGDATASE/ICESS, IEEE, Aug. 1, 2017, pp. 323-330.
Zhi-Hua Zhou et al: "Tri-training: exploiting unlabeled data using three classifiers", IEEE Transactions on Knowledge and Data Engineering, Nov. 1, 2005, pp. 1529-1541.
Transmittal of International Preliminary Report on Patentability dated Jan. 7, 2021, for International Application No. PCT/US2019/036109, filed Jun. 7, 2019, pp. 7.

\* cited by examiner

SELF-TRAINING CLASSIFICATION

RELATED APPLICATION

This application is a continuation of U.S. Ser. No. 16/023,413, filed on Jun. 29, 2018, which is herein incorporated by reference in its entirety.

TECHNICAL FIELD

Aspects and implementations of the present disclosure relate to classification, and more specifically, to classification models and training thereof.

BACKGROUND

As technology advances, the number and variety of devices that are connected to communications networks are rapidly increasing. Each device may have its own respective vulnerabilities which may leave the network open to compromise or other risks. Scanning of each device on a network can be useful for monitoring or securing a communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
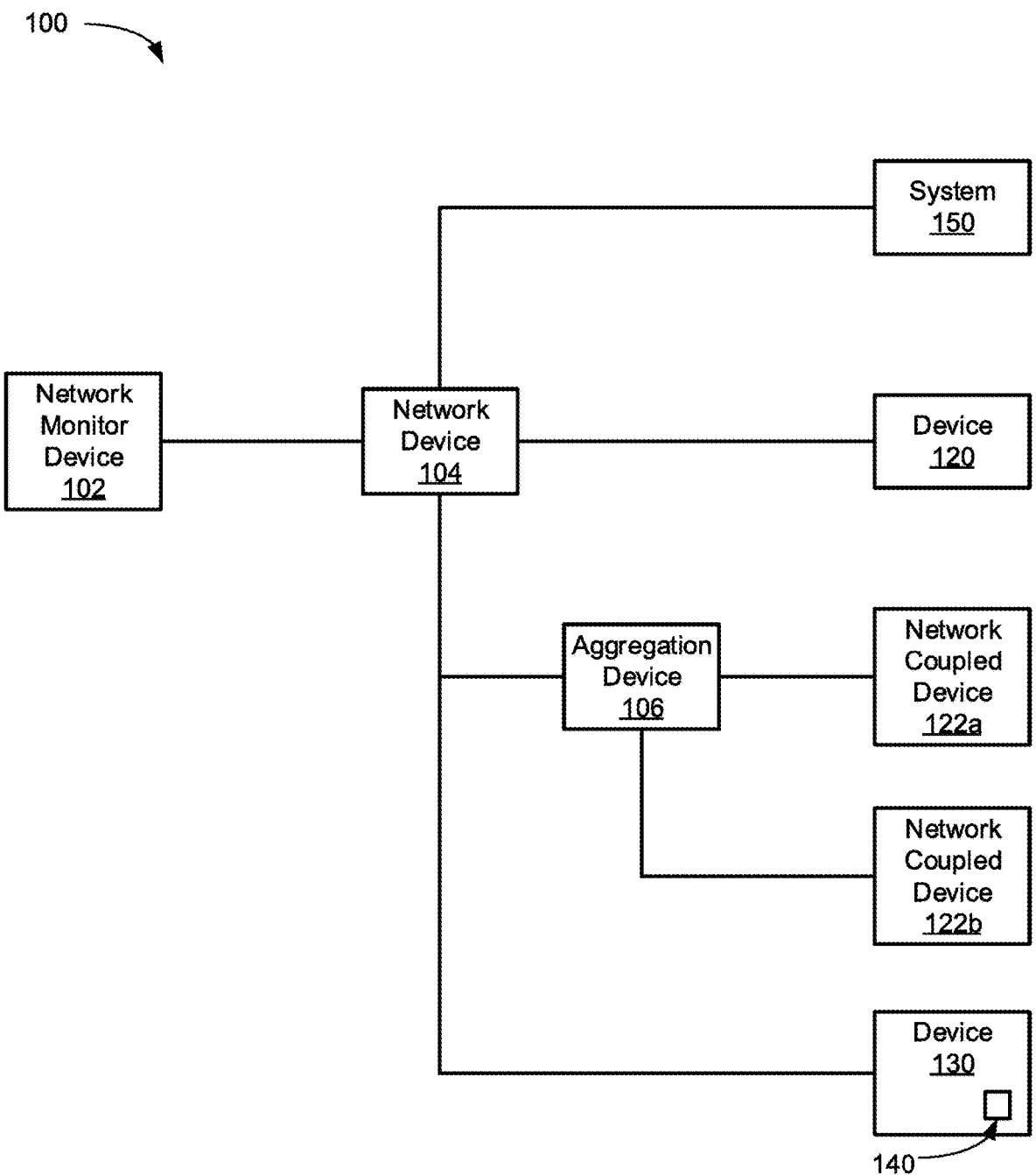
FIG. 1 depicts an illustrative communication network in accordance with one implementation of the present disclosure.

Aspects and implementations of the present disclosure are directed to device classification (but may applicable in other areas). The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that network security is maintained. Accordingly, described herein in various implementations are systems, methods, techniques, and related technologies, which enable the ongoing scanning of networks and classification of devices communicatively coupled to the network so that the devices or entities can be monitored for vulnerabilities, threats, and actions taken (e.g., based on a policy).

Classification is particularly important for securing a network because lack of knowledge about what a device can prevent application of appropriate security measures. Generally, it is difficult to efficiently validate classification accuracy. The validation is difficult because there are a large variety of devices, particularly internet of things (IoT) devices, which makes it impractical to build a lab to test each IoT device, and new devices are being brought to market at an increasing rate. Even when classifications are provided by users, there is not a reliable feedback mechanism to automatically tell the accuracy of the provided classifications (and they are subject to human error). The ultimate way to determine such accuracy is through human inspection. This is not practically feasible in many cases and particularly for large network environments. Further, some users may not have good visibility into the types of devices on their network making human inspection difficult.

Logs and real-time information can be collected to assist in analysis of false classification and unclassified devices. However, this presents a chicken-and-egg problem or causality dilemma because large scale accurate information is hard to obtain but needed to validate classification. Any information associated with a classification logic path just tells how a device is classified as A or B or C, but does not tell reliably whether the classification is right or wrong. Researchers can only guess from different sources of information. In other words, there is a lack of ground truth that can be automatically generated and at scale. Ground truth, in the context of classification, means the actual type, model of a device, or both.

Since validation of classification is difficult, the improvement of device profiles (including IoT device profiles) is similarly difficult. Multiple different methods in classification, such as installing agent on IoT devices to collect information, querying $3^{rd}$ party IoT aggregator APIs, scanning IoT devices, passive traffic analysis, offline IoT device log analysis, etc., exist. Each of these methods rely on availability of massive automatically generated "ground truth" to validate and further improve accuracy, which is not readily available.

Most classification methods mentioned above rely on an effective training process, as part of classical machine learning, to generate reliable profiles (also known as signatures). Based on having multiple classification methods and more than one or them being applicable to a particular environment, embodiments use multiple classification methods on the same devices, and uses the result(s) of relatively more reliable method(s) as ground truth to train other relatively less reliable methods. These training capabilities are referred to as "self-training" because the ground truth is generated from components of the same system (e.g., use results generated from the classification methods). In other words, self-training refers to the use of data generated by embodiments that is used to cross train different models. The use of self-training means that another independent source of data is not needed to train the models. Embodiments are able to use machine learning in automating classification to improve classification accuracy.

Multiple classification methods are used because any single method may either not be accurate enough or is accurate but does not cover certain devices or environments. For example, if an agent can be installed on an IoT device, it can collect very detailed information, and send that information to a device managing classification. This offers very high reliability information for classification. However, many IoT devices are 1) not under the control of developer of the agent or 2) are not able to host an agent due hardware or software limitations.

Another example is querying of a third party aggregator, e.g., an access point with multiple wireless IoT protocol interfaces (e.g., Zigbee, Z-wave, etc.). The aggregator may offer accurate device type information of the devices behind it. However, for IoT devices that are not behind or communicatively coupled to such an aggregator, this method does not provide any information.

Embodiments may include an example set of classification methods that may include the following, with an order of classification reliability from high to low and each being available on the same device (e.g., a network access control (NAC) device or other network device):

A—Agent based classification (e.g., IoT endpoint agent, Linux™ agent, etc.);

B—Device aggregator or inventory information source (e.g., third party IoT device aggregator inventory, device inventory, ServiceNow™ inventory, etc.);

C—Active probing (e.g., scanning an IoT device's open transmission control protocol/user datagram protocol (TCP/UDP) ports);

D—Passive real-time traffic analysis (e.g., application protocol fingerprinting, media access control (MAC) address vendor checking, etc.);

E—Passive traffic log analysis (e.g., firewall logs, logs from a third party system, etc.);

F—Traffic based behavior heuristics (e.g., device communication timings, etc.).

Each of the methods may perform classification based on a respective model. In some embodiments, methods D and E may be based on behavioral analysis. In various embodiments, manual classification data may further be used with a high classification reliability level but it is appreciated that manual classification data may be subject human error. Embodiments may support additional or different methods than those described herein.

In many environments, one or more of the above methods cannot be applied on the same device (e.g., an IoT device). However, there's also a high likelihood that more than one method is applicable. For example, if A, B, C, and D can be applied to the same IoT device, the result of method A can be used to train methods B, C, and D to improve their accuracy. Similarly, the results of A and B can be used to train methods C and D. In general, the result of any more reliable method can be used to train any less reliable method. As another example, in some environments it may be possible to poll a switch while in another environment it may not be possible to poll or communicate with a switch so such information will not be available and therefore a method based on polling the switch will be unavailable.

Generally speaking, the more reliable a method is, the higher requirements the method will have on the environment thus making the method less applicable or narrower in scope. For example, a method that employs an agent may be very accurate but is only able to provide information on devices that support the installation and operation of an agent. With a self-training model, the accuracy of less reliable but more generally applicable methods can be improved without requiring manually created ground truth. While this may not improve the overall accuracy for devices being classified using the highly reliable methods, it will improve the overall accuracy for devices or environments where highly reliable methods cannot be applied.

Further considerations may be taken into account when using particular methods. For example, methods D and E can be CPU computationally intensive thereby making their availability subject to the availability to computational resources. Similarly, the active probing of method C may not be time consuming or unavailable because devices (e.g., medical devices, operational technology devices, etc.) in the environment to do not handle active probing well (e.g., an Nmap™ scan).

In some embodiments, the relative reliability level of a model associated with a classification method may not be constant. In one environment, method C may be more reliable than method D but in another environment, method D may be more reliable than method C. The ordering based on reliability or confidence may thus be different or change with each environment. For example, if there is a reliable source of inventory information (method B) of devices on the network then the confidence or reliability level of that data may be very high. However, if there is not a reliable source of inventory information of devices on the network, then the confidence or reliability level of data associated with method B is relatively low. Accordingly in some embodiments, the relative reliability for each method may be configurable, may be adjusted on the fly, or a combination thereof. In some embodiments, the relative reliability may be user configurable. Referring to the inventory example above, a user may be prompted to enter the confidence level that should be associated with data from the inventory data source. In some embodiments, one or more of the classification methods may have a default reliability that is assigned to it which may then be optionally adjusted by a user. In various embodiments, a user may disable one or more of the classification methods (e.g., based on environment limitations or user preference).

In some embodiments, based on analysis of the classification method output, the reliability level of a classification method may be automatically adjusted. For example, if the classification results of the classification method are too general, not meaningful (e.g., few devices classified, if any or just partial matching patterns), or below a threshold (e.g., a threshold number of classifications or matching patterns), the reliability level can be adjusted lower automatically. The automatic adjustment of the reliability level may be a change from the default reliability level of a classification method.

In some embodiments, the device performing the classification will perform an initial classification of an environment or network and based on that classification rank the confidence level of each of the methods and availability of the various classification methods. The initial classification may be performed using less disruptive or invasive methods, e.g., passive traffic monitoring (method D) as opposed to active probing (method C). Based on the initial classification, certain methods, e.g., active probing (method C), may be disabled for environments having medical, operational technology devices, or infrastructure technology or other devices sensitive or unable handle active probing well.

Embodiments provide an effective way to validate accuracy of certain classification methods, without requiring manually generated ground truth. With the ground truth generated from the same system, embodiments provide an efficient way to fine tune and improve the accuracy of less reliable but more widely applicable classification methods, thus significantly improving the overall classification accuracy. Embodiments thus remove the requirement for a ground truth data source (e.g., by using self-training among the data sources).

Using the most reliable classification method result as ground truth, not only can embodiments tune and improve the accuracy of other classification methods, but embodiments can use the ground truth to screen and filter out the existing false positive and false negative prone methods, which may cause issues in practice.

The ground truth provides embodiments the evidence to adjust the confidence score or reliability level of each individual fingerprint, thus when a classification conflict occurs, e.g., one device matching two fingerprints in two different categories, embodiments are able to resolve the conflict quickly based on the result of the method with the higher confidence score or reliability.

In some embodiments, the training may be performed using distributed or remote resources. For example, cloud compute resources or local compute resources (e.g., a server on the same network) to a device performing classification can be used to cross train the models associated with each method. The cross trained models may then be sent back to the device performing classification and the cross trained models can be used for performing classification. The usage of additional compute resources may done during times where the device performing classification has insufficient resources (e.g., compute bandwidth) for performing the cross training of the models using its own resources. In some embodiments, the device performing classification may perform the cross training when there is an idle period or reduced network traffic (e.g., 3 AM or early in the morning in the local time zone).

Accordingly, described herein in various implementations are systems, methods, techniques, and related technologies, which enable self-training classification. As described herein, various techniques can be used to perform classification using a plurality of classification methods and then train classification models based on the results of the classifications of the plurality of methods.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, medical devices, infrastructure devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including performing classification using a plurality of classification methods and then using the results of classification to train models associated with the classification methods based on relative reliability of the classification methods, as described herein. The classification of devices on network 100 may be performed periodically or based on devices being communicatively coupled to network 100 (e.g., recoupled to the network or communicatively coupled for the first time).

In some embodiments, an initial scan (or classification using one or more less invasive classification methods) of the network 100 is performed to determine if any devices (e.g., devices 106 and 120-130) are sensitive to certain classification methods. For example, if device 120 or device 106 are medical devices, OT devices, or other infrastructure devices, network monitor device 102 may determine that classification methods that include active probing should be disabled or not performed during classification of devices on network 100 (e.g., using a plurality of classification methods).

Network monitor device 102 may further perform a variety of functions including identification, classification, and taking one or more remediation actions (e.g., changing network access of an account, disabling an account, modifying a configuration of a network device, changing access permissions on a cloud storage resource, sending an email or short message service (SMS) alert, etc.) based on the results of the classification/identification. For example, based on a device classification as an IP camera, the device may be restricted from the Internet or accessing sensitive parts of the network.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of devices and entities by network monitor device 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, or web interface), which are described further herein. Network monitor device 102 may be operable to use one or more APIs to communicate with aggregation device 106, device 120, device 130, or system 150. Network monitor device 102 may monitor for or scan for devices that are communicatively coupled to a network via a NAT device (e.g., firewall, router, etc.) dynamically, periodically, or a combination thereof.

Information from one or more external or 3$^{rd}$ party systems (e.g., system 150) may further be used to determine properties or information associated with one or more devices or entities. For example, a vulnerability assessment (VA) system may be queried to access information about a device or entity (e.g., particular IOCs associated with an account or cloud storage resource). External or 3$^{rd}$ party systems may also be used to perform a scan or a check on an entity to determine compliance or gather information associated with an entity.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140 (e.g., account information). While network monitor device 102 may be able to receive information from agent 140, installation or execution of agent 140 on many devices may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, a mobile device management (MDM) system, a firewall (FW) system, a switch system, an access point system, etc. Network monitor device 102 may be configured to communicate with system 150 to obtain information about devices 120 and 130, network coupled devices 122a-b, and entities on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor device 102.

The mobile device management (MDM) system may be configured for administration of mobile devices, e.g., smartphones, tablet computers, laptops, and desktop computers. The MDM system may provide information about mobile devices managed by MDM system including accounts, operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor device 102 which may be used to monitor devices and control network access of one or more devices. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user or account information of a device being monitored in real-time which can then be used to determine a risk level of the device.

Aggregation device 106 may be configured to communicate with network coupled devices 122a-b and provide network access to network coupled devices 122a-b. Aggregation device 106 may further be configured to provide information (e.g., operating system, device software information, device software versions, device names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
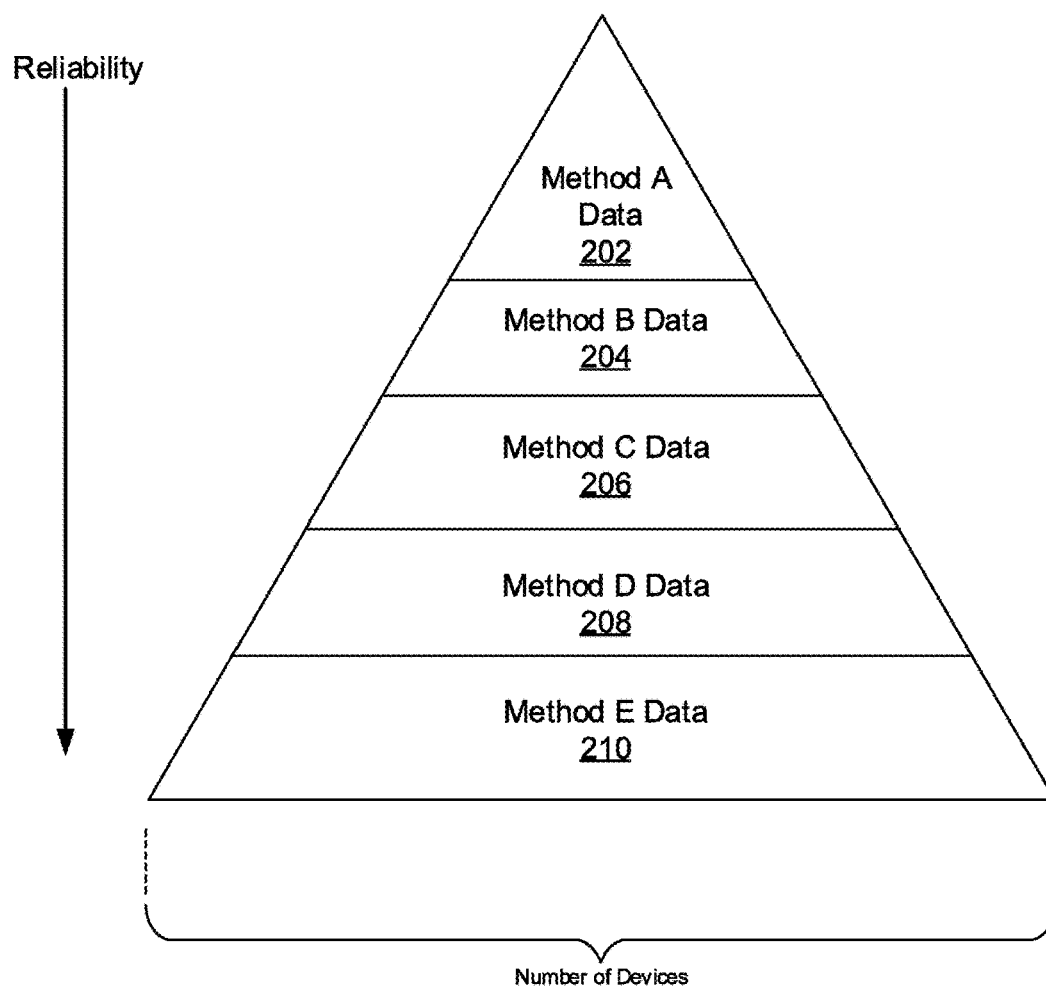
FIG. 2 depicts a diagram of aspects of a plurality of classification methods in accordance with one implementation of the present disclosure.

FIG. 2 depicts a diagram of aspects of a plurality of classification methods in accordance with one implementation of the present disclosure. FIG. 2 depicts reliability and number of devices aspects of a plurality of classification methods. FIG. 2 depicts an example diagram 200 of a triangle or a pyramid shape based on the relative reliability and relative number of devices associated with each classification method. A classification method with a higher confidence level or reliability probably has a narrower scope or a lower number devices that can be classified as compared to the classification methods with a lower reliability.

As shown example diagram 200 reflects the fact that method A has the highest reliability and data for the smallest number of devices classified and method B has the next highest reliability and next smallest number of devices classified. Method C has the next highest reliability and next smallest number of devices classified and method B has the next highest reliability and next smallest number of devices classified. Finally, method E has that least reliability but the largest number of devices classified.

A correlation of method A and method B may be performed (e.g., to create training data on a per device basis) and then used to train method C. For the correlation of method A and method B, if there is a method A classification result and a method B classification result for a particular device, then based on method A being more reliable, the method A classification result will be selected as part of the training of method B. The training of method B will thus correlate the device classification data output for method A and method B to create a superset of data. That is, the classification from the more reliable classification method is used for generating training data which can then be used to train a less reliable classification method C model.

TABLE I

Example Classification Data

| Device | Classification | Classification method |
|---|---|---|
| 10.10.10.100 | IP Camera | Method A |
| | Unknown Partial data pattern | Method B |
| | Physical security device | Method C |

Table I shows example data for a particular device, an IP camera, with an IP address of 10.10.10.100. The classification result from classification method A is IP camera. The classification result from method B is unknown with a partial data pattern (e.g., a match among multiple fingerprints). The classification result from classification method C is a physical security device classification. Based on the data of Table I, method A may be used to train the models of methods B and C according to embodiments. In addition, method A may be used to train method B which in turn may be used to train method C.

Figure 3:
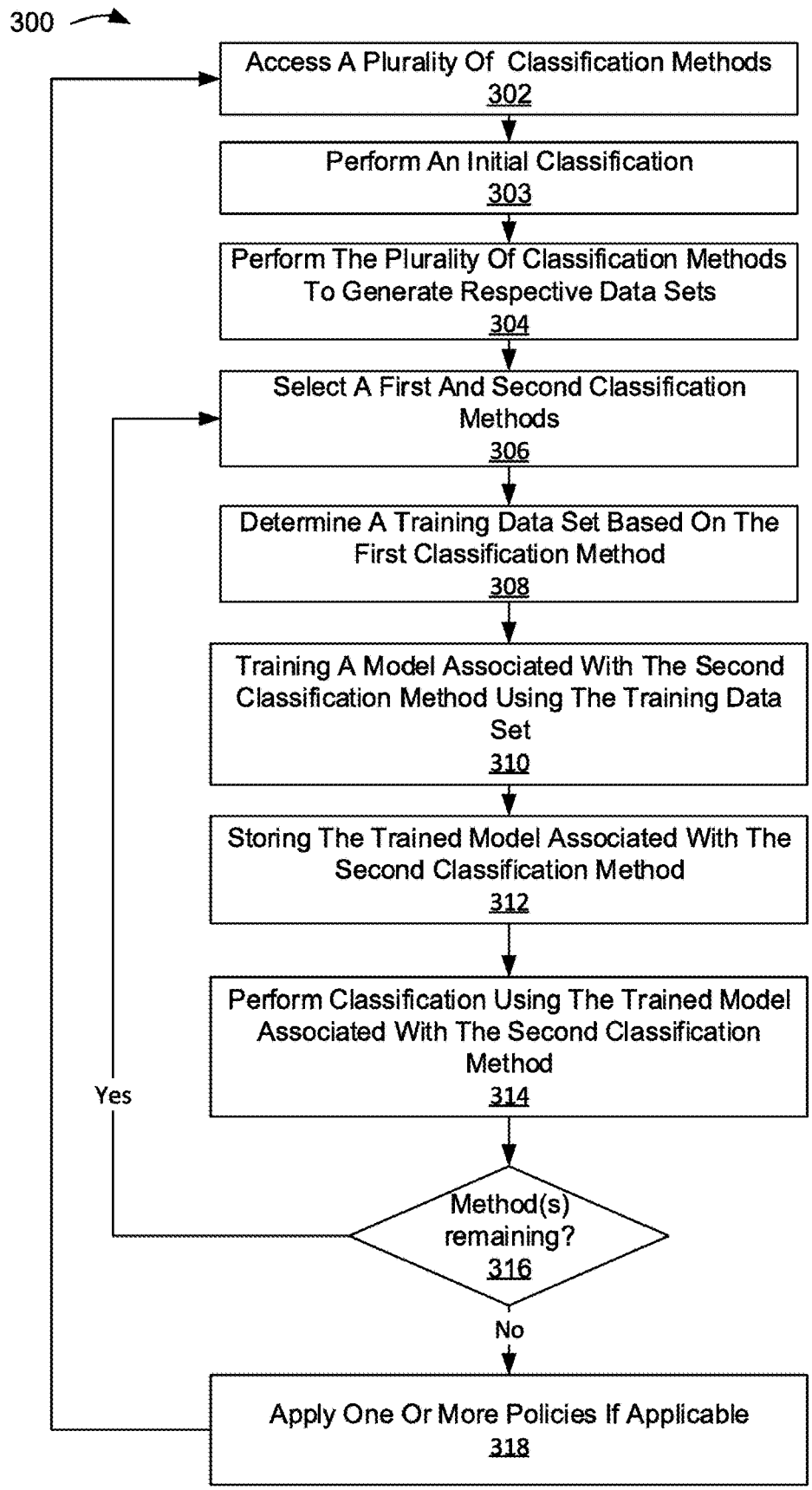
FIG. 3 depicts a flow diagram of aspects of a method for training a plurality of respective models associated with a plurality of classification methods in accordance with one implementation of the present disclosure.

With reference to FIG. 3, flowchart 300 illustrates example functions used by various embodiments. Although specific function blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 3 depicts a flow diagram of aspects of a method for training a plurality of respective models associated with a plurality of classification methods in accordance with one implementation of the present disclosure. Flowchart 300 shows a process for training models using data from more reliable classification methods (e.g., on per device basis). Various portions of flowchart 300 may be performed by different components (e.g., components of system 400) of a device (e.g., network monitor device 102). The process of flowchart 300 may be performed by a NAC device as part of a classification process.

In some embodiments, portions of flowchart 300 may be performed to train respective models of classification in a cascading fashion (e.g., pairs of classifications have reliability levels that are adjacent among the available classification methods), parallel, or some variation thereof. For example, a first classification method model can be used to train a second classification method, a third classification model, and a fourth classification model.

At block 302, a plurality of classification methods are accessed. The classification methods may include agent based classification (e.g., IoT endpoint agent, Linux™ agent, etc.) (method A), device aggregator or inventory information source (e.g., third party IoT device aggregator inventory, device inventory, ServiceNow™ inventory, etc.) (method B), active probing (e.g., scanning an IoT device's open TCP/UDP ports) (method C), passive real-time traffic analysis (e.g., application protocol fingerprinting, MAC address vendor checking, etc.) (method D), passive traffic log analysis (e.g., firewall logs, logs from a third party system, etc.) (method E), traffic based behavior heuristics (e.g., device communication timings, etc.) (method F), as described herein. The plurality of classification methods may have respective associated models that are accessed along with the plurality of classification methods.

At block 303, an initial classification is (optionally) performed. The initial classification may be performed using less disruptive or invasive methods, e.g., passive traffic monitoring (method D) as opposed to active probing (method C). Based on the initial classification, certain methods, e.g., active probing (method C), may be disabled for environments having medical, operational technology devices, or infrastructure technology or other devices that are sensitive to particular methods (e.g., active probing). The initial scan can thus be used to determine which of the classification methods are allowed or available for performing in a network environment being classified. In some embodiments, classification methods that are not allowed in an environment are disabled from being used for classification (e.g., until the environment changes or the classification methods change to be suitable for use in the environment). In some embodiments, one or more classification methods may be customized for the environment (e.g., certain data may not be collected or certain parts of the method not performed).

At block 304, the plurality of classification methods are performed to generate respective data sets, as described herein. Each of the classification methods (e.g., that are available for the network environment based on the initial classification) may be performed independently (e.g., in parallel, serial, or a combination thereof). These methods produce data sets include classifications on a per device basis can be used to generate training data to train models for classification methods.

At block 306, a first and a second classification method are selected. The first and second classification methods can be selected based on the second classification method being less reliable than the first classification method. It is appreciated that the first classification method be any of the classification methods that have a higher reliability than the second classification method. That is, the first classification method may not be the closest in reliability to the second classification method. The first classification method may be any of the classification methods that has a higher reliability than the second classification method.

Block 306 may be performed until each of the classification methods available in an environment are trained (e.g., using one or more data sets from more reliable classification methods).

At block 308, a training dataset (e.g., label data) is determined based on the first classification method. The training data set may have been determined during the performance of the first classification method and include data for each device for which the first classification method has a classification result and the second classification method has a classification result or associated data (e.g., partial data for a classification).

At block 310, a model associated with the second classification method is trained using the training data set. The model is a machine learning model associated with the second classification method. Embodiments may support other types of models. The training uses the known results from the more reliable classification method to train the less reliable method. The second classification method model is thus trained using a training data set associated with a higher reliability level, first classification method. The training can be used to adjust the fingerprints and other properties that are used by the second classification method to perform classification.

The training may be done a per device basis meaning that for each device classified, the device classification from the higher reliability first classification method is chosen as part of the training of the model associated with the second classification method. Where a device classification is not available from the first classification method but it available from the second classification method, the classification result from the second classification method will be used in the trained model associated with second classification method. Where is device classification is not available from the second classification method but partial information is available that is associated with the device from the second classification and there is a device classification available from the first classification method, the model associated with the second classification method can be trained based on the device classification of the first classification method and the partial information available from the second classification.

In some embodiments, where the first classification method does not have a classification result but has partial data and the second classification method has a classification along with the same partial data, the model associated with the first classification can be trained for that device using the second classification method.

It is appreciated that if a classification method is just retrieving information from data source and copying it then training of the model for the classification method may not be performed and instead the data results associated with the less reliable classification method can be adjusted based on the result for each device using the more reliable classification method.

At block 312, the trained model associated with the second classification method is stored. The trained model for the second classification method may be stored to be used to train other classification methods that are less reliable than the second classification method (e.g., a third classification method, where the third classification method is less reliable than the first classification method and the second classification method).

At block 314, classification (optionally) is performed using the trained model associated with the second classification method. The trained model associated with the second classification method can be used to perform an updated classification using the trained model thereby providing improved classification. In some embodiments, if the model of the second classification method was not changed as part of the training, then block 314 may not be performed.

At block 316, whether classification method models are remaining to be trained is determined. If there are classification method models left to be trained, block 306 may be performed. If there are not classification method models left to be trained, block 318 may be performed. The result of performing blocks 302-316 for each of the classification methods is that the models of the each of the classification methods, with a reliability level less than the classification method with the highest reliability level, may be improved. As a model associated with a classification method is improved, the improved model can then be used to perform classification going forward including being applied to new devices.

In some embodiments, the improved models associated with the classification methods are uploaded to a central repository (e.g., in a cloud) so that the classification methods can be improved and distributed.

At block 318, one or more policies may be applied. The one or more policies may be applied based on the classification of a device satisfying a condition of the policy and one or more actions performed based on the policy, as described herein.

Figure 4:
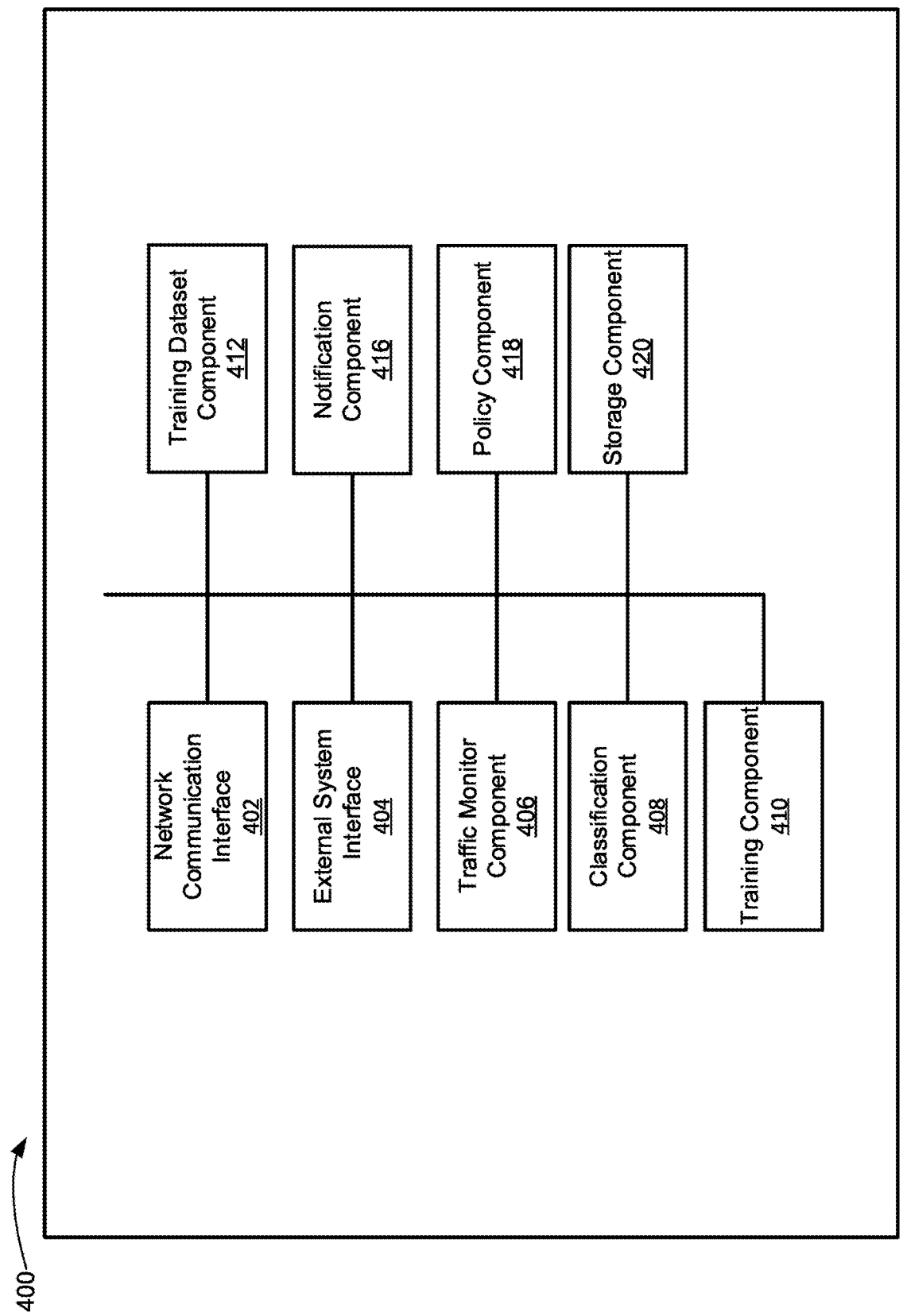
FIG. 4 depicts illustrative components of a system for training a plurality of respective models associated with a plurality of classification methods in accordance with one implementation of the present disclosure.

FIG. 4 illustrates example components used by various embodiments. Although specific components are disclosed in system 400, it should be appreciated that such components are examples. That is, embodiments are well suited to having various other components or variations of the components recited in system 400. It is appreciated that the components in system 400 may operate with other components than those presented, and that not all of the components of system 400 may be required to achieve the goals of system 400.

FIG. 4 depicts illustrative components of a system for training a plurality of respective models associated with a plurality of classification methods in accordance with one implementation of the present disclosure. Example system 400 includes a network communication interface 402, an external system interface 404, a traffic monitor component 406, a classification component 408, a training component 410, a training dataset component 412, a notification component 416, and a policy component 418, and a storage component 420. The components of system 400 may be part of a computing system or other electronic device (e.g., network monitor device 102) or a virtual machine and be operable to monitor and one or more devices communicatively coupled to a network. For example, the system 400 may further include a memory and a processing device, operatively coupled to the memory, which may perform the functions of or execute the components of system 400. The components of system 400 may access various data associated with one or more devices that are local or remote (e.g., one or more networks, in cloud systems, etc.). It is appreciated that the modular nature of system 400 may allow the components to be independent and allow flexibility to enable or disable individual components or to extend/upgrade components without affecting other components thereby providing scalability and extensibility. System 400 may perform one or more blocks of flow diagram 300.

Communication interface 402 is operable to communicate with one or more devices (e.g., network device 104) coupled to a network that are coupled to system 400 and receive or access information about devices (e.g., properties or information associated with entities, endpoints, etc.) coupled to the network, as described herein. The communication interface 402 may be operable to work with one or more components to initiate the communication with one or more resources to determine information to be used for classification.

External system interface 404 is operable to communicate with one or more third party, remote, or external systems (e.g., system 150) to access information about one or more devices, entities, or a combination thereof. External system interface 404 may further store the accessed information in a data store (e.g., via storage component 420). For example, external system interface 404 may access information from a cloud based system thereby enabling system 400 to classify devices in a cloud based system. External system interface 404 may be operable to communicate with a vulnerability assessment (VA) system, an advanced threat detection (ATD) system, a mobile device management (MDM) system, a firewall (FW) system, a switch system, an access point (AP) system, etc. External system interface 404 may query a third party system (e.g., system 150) using an API or CLI. For example, external system interface 404 may query a firewall for information of devices behind the firewall.

Traffic monitor component 406 is operable to monitor network traffic for use in classification, as described herein. Classification component 408 is configured to perform classification of devices using a plurality of classification methods based on a network environment (e.g., network 100), as described herein. Classification component 408 may perform the classification using information from network communication interface 402, external system interface 404, and traffic monitor component 406. In some embodiments, classification component 408 may perform an initial classification (e.g., passive traffic analysis classification) to determine which of the plurality of classification method should be used in a particular environment.

Training component 410 is configured to select one or more methods to be used for training models associated with the classification methods, as described herein. Training component 410 is further configured to perform training of the model associated with a selected classification method based on a classification method with a relatively higher reliability than the classification method associated with the model being trained, as described herein. Training component 410 may perform the training using a training dataset (e.g., from training dataset component 412). Training component 410 may store the trained model using storage component 420. Training component 410 may invoke classification component 408 to perform classification after a model associated with a classification method has been trained.

Training dataset component 412 is configured to determine a training dataset for use in training a model associated with a classification method, as described herein. The model may be associated with a classification method selected by training component 410. Classification component 408, training component 410, and training dataset component 412 may perform various portions of flowchart 300.

Notification component 416 is operable to initiate one or more notifications based on the results of policies applied to one or more entities, endpoints, or a combination thereof, as described herein. The notification may be any of a variety of notifications, e.g., IT ticket, email, SMS, a HTTP notification, etc., as described herein.

Policy component 418 is operable for initiating or triggering one or more classification, remediation actions or security actions with respect to devices, entities, endpoints, or a combination thereof, as described herein. Policy component 418 may further be configured to perform other functions including checking entity compliance status, checking endpoint compliance status, finding open ports, etc. Policy component 418 may restrict network access of an entity (e.g., of an account, a network device, cloud resources, etc.), as described herein. The policy component 418 may thus, among other things, invoke automatically restrict network access of one or more entities and one or more entities.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Storage component 420 is operable to store information of classification results related to entities present on a network (e.g., local, remote, etc.) and to store information associated with classification methods and associated models, as described herein, for future access and application of one or more policies.

The system 400 may be software stored on a non-transitory computer readable medium having instructions encoded thereon that, when executed by a processing device, cause the processing device to access a plurality of device classification methods. Each of the plurality of methods has a respective associated model, and each of the plurality of methods has a respective associated reliability level. The instructions may further cause the processing device to generate a respective data set associated with each of the device classification methods based on classifying a plurality of devices communicatively coupled to a network and select a first device classification method and a second device classification method of the plurality of device classification methods. The first device classification method has a higher reliability level than the second device classification method. The instructions may further cause the processing device to determine a training data set using a respective data set associated with the first device classification method and train the second device classification method model using the training data set. The instructions may further cause the processing device to store the trained second device classification model.

In some embodiments, the instructions further cause the processing device to perform an initial classification of the plurality of devices communicatively coupled to the network and determine which of the plurality of device classification methods can be used based on the initial classification of the plurality of devices communicatively coupled to the network. In various embodiments, the instructions further cause the processing device to perform classification using the second device classification method. In some embodiments, the training of the second device classification method model using the training data set is performed on a per device basis. In various embodiments, each respective model associated with the plurality of device classification methods is a machine learning model. In some embodiments, the respective associated reliability level associated with the plurality of device classification methods is configurable. In various embodiments, the selecting of the first device classification method and the second device classification method of the plurality of device classification methods is based on a network environment. In some embodiments, the first device classification method comprises at least one of an agent based classification method, an aggregator based method, an active probing based method, a passive traffic analysis method, a traffic log analysis method, or a traffic based behavior heuristic method.

Figure 5:
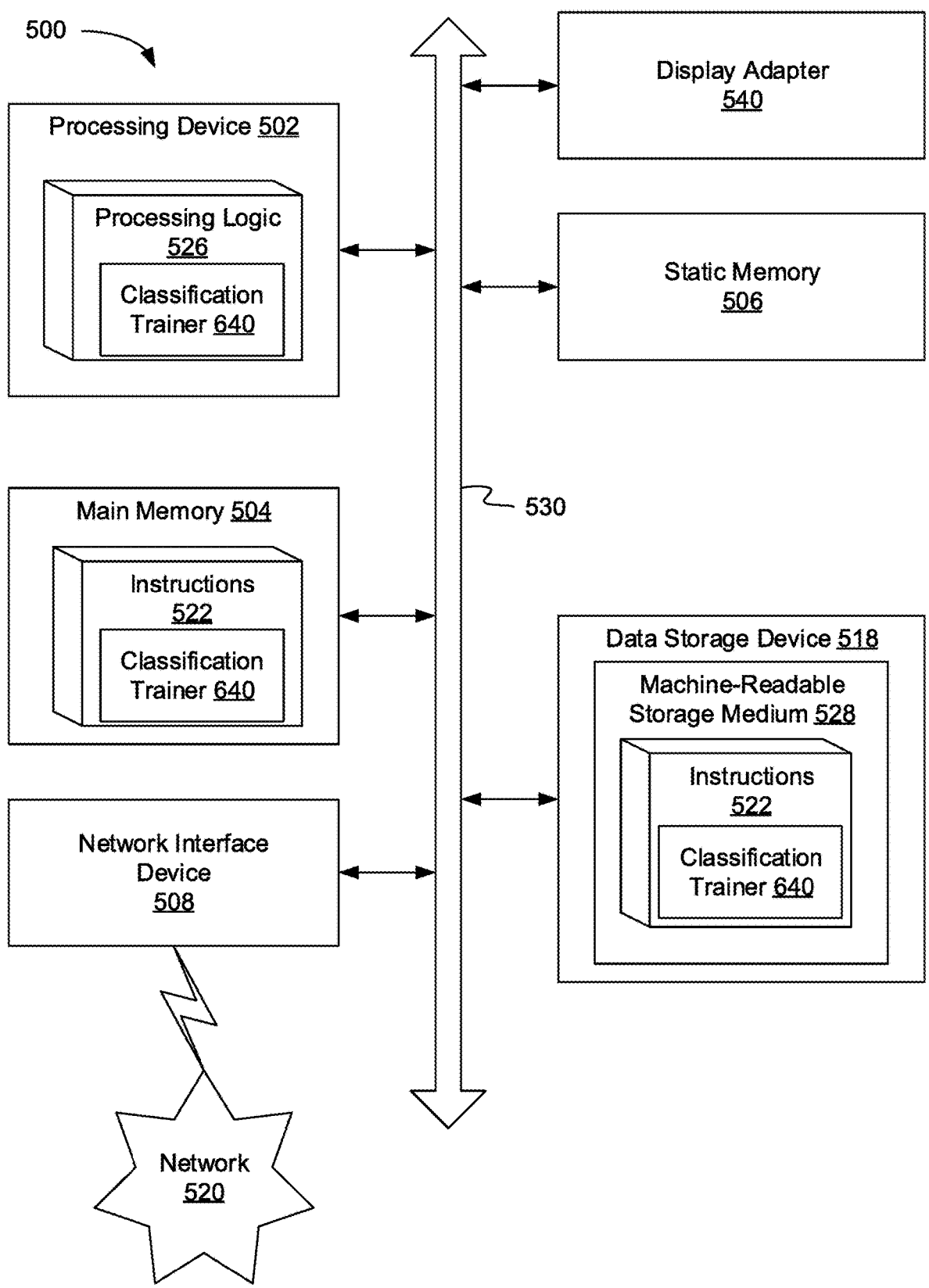
FIG. 5 is a block diagram illustrating an example computer system, in accordance with one implementation of the present disclosure.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as network monitor device 102 configured to access and train one or more classification methods, as described herein.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), a data storage device 518 (e.g., storage component 620 or operable in conjunction therewith), and display adapter 540, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of system 400 shown in FIG. 4, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute classification trainer 400. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for accessing and training classification models, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Display adapter 540 may be a graphics processing unit (GPU) or other visually configured or related output device and be configured for output of video, audio, and other signals to a display device (not shown). In some embodiments, display adapter 540 may be configured for communicatively coupling with a display device and outputting thereto. In various embodiments, display adapter 540 may include a display device. Display adapter 540 may work with display component 614 to render, output, or a combination thereof one or more GUIs and text based interfaces including information associated with classification methods or models.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A training method comprising:
   accessing a plurality of device classification methods, wherein each of the plurality of methods has a respective associated model, and wherein each of the plurality of methods has a respective associated reliability level;
   generating a respective data set associated with each of the device classification methods based on classifying a plurality of devices communicatively coupled to a network;
   selecting a set of device classification methods from the plurality of device classification methods, wherein the set of device classification methods comprises a hierarchy of reliability;
   determining a training data set using a respective data set associated with a first device classification method of the set of classification methods;
   training, by a processing device, a second device classification method using the training data set generated from performing the first device classification method and wherein the second device classification method has a higher reliability level than the first device classification method;
   determining a second training data set using an output of the second device classification method;
   training a third device classification method using the second training data set generated from performing the second device classification method, wherein the second device classification method has a higher reliability level for classifying a device than the third classification method; and
   storing the trained second device classification model and the trained third device classification method.

2. The training method of claim 1, further comprising:
   performing an initial classification of the plurality of devices communicatively coupled to the network; and
   determining which of the plurality of device classification methods can be used based on the initial classification of the plurality of devices communicatively coupled to the network.

3. The training method of claim 1, further comprising:
   performing classification using the second device classification method.

4. The training method of claim 1, wherein the training of the second device classification method model using the training data set is performed on a per device basis.

5. The training method of claim 1, wherein each respective model associated with the plurality of device classification methods is a machine learning model.

6. The training method of claim 1, wherein the respective associated reliability level associated with the plurality of device classification methods is configurable.

7. The training method of claim 1, wherein the respective associated reliability level associated with a device classification method is automatically adjusted based on one or more classification results based on the device classification method.

8. The training method of claim 1, wherein the selecting of the first device classification method and the second device classification method of the plurality of device classification methods is based on a network environment.

9. The training method of claim 1, wherein the first device classification method comprises at least one of an agent based classification method, an aggregator based method, an active probing based method, a passive traffic analysis method, a traffic log analysis method, or a traffic based behavior heuristic method.

10. A system comprising:
    a memory; and
    a processing device, operatively coupled to the memory, to:
    access a plurality of device classification methods, wherein each of the plurality of methods has a respective associated model, and wherein each of the plurality of methods has a respective associated reliability level;

generate a respective data set associated with each of the device classification methods based on classifying a plurality of devices communicatively coupled to a network;
select a set of device classification methods from the plurality of device classification methods, wherein the set of device classification methods comprises a hierarchy of reliability;
determine a training data set using a respective data set associated with a first device classification method of the set of classification methods;
train a second device classification method using the training data set generated from performing the first device classification method and wherein the second device classification method has a higher reliability level than the first device classification method;
determine a second training data set using an output of the second device classification method;
train a third device classification method using the second training data set generated from performing the second device classification method, wherein the second device classification method has a higher reliability level for classifying a device than the third classification method; and
store the trained second device classification model and the trained third device classification model.

11. The system of claim 10, wherein the processing device further to:
perform an initial classification of the plurality of devices communicatively coupled to the network; and
determine which of the plurality of device classification methods can be used based on the initial classification of the plurality of devices communicatively coupled to the network.

12. The system of claim 10, wherein the processing device further to:
perform classification using the second device classification method.

13. The system of claim 10, wherein the training of the second device classification method model using the training data set is performed on a per device basis.

14. The system of claim 10, wherein each respective model associated with the plurality of device classification methods is a machine learning model.

15. The system of claim 10, wherein the respective associated reliability level associated with the plurality of device classification methods is configurable.

16. The system of claim 10, wherein the selecting of the first device classification method and the second device classification method of the plurality of device classification methods is based on a network environment.

17. The system of claim 10, wherein the first device classification method comprises at least one of an agent based classification method, an aggregator based method, an active probing based method, a passive traffic analysis method, a traffic log analysis method, or a traffic based behavior heuristic method.

18. A non-transitory computer readable medium having instructions encoded thereon that, when executed by a processing device, cause the processing device to:
determine which of a plurality of device classification methods can be used based on an initial classification of a plurality of devices communicatively coupled to a network;
generate a respective data set associated with each of a plurality of device classification methods based on classifying a plurality of devices communicatively coupled to a network, wherein each of the plurality of methods has a respective associated model, and wherein each of the plurality of methods has a respective associated reliability level for classifying a device communicatively coupled to the network;
determine a training data set using one of the respective data sets associated with a first device classification method of the plurality of the methods; and
train, by the processing device, a second device classification method model using the training data set.

19. The non-transitory computer readable medium of claim 18, wherein to train the second device classification method model using the training data set is performed on a per device basis.

20. The non-transitory computer readable medium of claim 18, wherein the first device classification method and the second device classification method of the plurality of device classification methods are selected based on a network environment.

* * * * *